US010918985B2

(12) United States Patent
Marks et al.

(10) Patent No.: US 10,918,985 B2
(45) Date of Patent: Feb. 16, 2021

(54) FILTER ELEMENT AND SEAL THEREFOR (75) Inventors: Nathan E. Marks, Rosemount, MN (US); Thomas J. Hamlin, Vernon, CT (US); Gokhan Kuruc, Meriden, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 1177 days.

(21) Appl. No.: 13/127,065

(22) PCT Filed: Nov. 3, 2009

(86) PCT No.: PCT/US2009/063066
§ 371 (c)(1),
(2), (4) Date: Jul. 11, 2011

(87) PCT Pub. No.: WO2010/053898
PCT Pub. Date: May 14, 2010

(65) Prior Publication Data
US 2011/0259812 A1 Oct. 27, 2011

Related U.S. Application Data (60) Provisional application No. 61/111,185, filed on Nov. 4, 2008.

(51) Int. Cl.
*B01D 29/00* (2006.01)
*B23P 17/04* (2006.01)
(Continued)

(52) U.S. Cl.
CPC .......... *B01D 46/2403* (2013.01); *B01D 29/41* (2013.01); *B01D 46/002* (2013.01); *B01D 2275/202* (2013.01); *Y10T 29/4998* (2015.01)

(58) Field of Classification Search
CPC .............. B01D 29/41; B01D 2275/202; B01D 46/002; B01D 46/2403; B01D 33/23
(Continued)

(56) References Cited

U.S. PATENT DOCUMENTS 2,863,561 A * 12/1958 Just et al. ............... 210/347
3,261,474 A * 7/1966 Parker et al. ........... 210/487
(Continued)

FOREIGN PATENT DOCUMENTS

DE 3741552 6/1989
EP 1398065 3/2004
(Continued)

OTHER PUBLICATIONS

Oxford Dictionary, "The Concise Oxford Dictionary," 10th edition, ed. Judy Pearsall, Oxford University Press, New York, 1999, 3 pages.*
(Continued)

*Primary Examiner* — Bobby Ramdhanie
*Assistant Examiner* — Denise R. Anderson
(74) *Attorney, Agent, or Firm* — Scott A. Baum (57) ABSTRACT

A filter cell element for use in a housing to form a filtering assembly. The filter element has a media pack having an interior and a separator element having a passage therein for radial fluid communication between the media pack interior and an edge of the media pack. An overmold seal at the media pack edge seals the media pack to the separator element. Methods of making the filter element and methods of using are also disclosed.

11 Claims, 4 Drawing Sheets

(51) Int. Cl.
  *B01D 46/24* (2006.01)
  *B01D 29/41* (2006.01)
  *B01D 46/00* (2006.01)

(58) Field of Classification Search
  USPC .......................................... 210/483; 29/527
  See application file for complete search history.

(56) References Cited

U.S. PATENT DOCUMENTS

| | | | |
|---|---|---|---|
| 3,648,844 A * | 3/1972 | Krynski | B01D 29/39 |
| | | | 210/487 |
| 4,637,876 A * | 1/1987 | Dosoudil | B01D 33/23 |
| | | | 210/331 |
| 4,637,877 A * | 1/1987 | Hartmann et al. | 210/347 |
| 4,783,262 A | 11/1988 | Ostreicher et al. | |
| 4,828,694 A | 5/1989 | Leason | |
| 4,881,313 A | 11/1989 | Artinyan et al. | |
| 5,049,274 A | 9/1991 | Leason et al. | |
| 5,055,192 A * | 10/1991 | Artinyan et al. | 210/346 |
| 5,490,930 A | 2/1996 | Krull | |
| 5,592,935 A * | 1/1997 | Elstran | A62B 7/02 |
| | | | 128/205.25 |
| 6,120,685 A | 9/2000 | Carlson et al. | |
| 6,165,303 A | 12/2000 | Darby et al. | |
| 6,306,298 B1 | 10/2001 | Diemer | |
| 6,458,269 B1 | 10/2002 | Bassett et al. | |
| 6,712,966 B1 | 3/2004 | Pulek et al. | |
| 6,716,348 B1 | 4/2004 | Morgan | |
| 6,827,846 B2 | 12/2004 | Knight | |
| 6,830,683 B2 | 12/2004 | Gundrum et al. | |
| 6,939,466 B2 * | 9/2005 | Pulek | B01D 25/001 |
| | | | 210/317 |
| 6,949,189 B2 | 9/2005 | Bassett et al. | |
| 7,147,772 B2 | 12/2006 | Fritze | |
| 7,582,209 B2 | 9/2009 | Pulek et al. | |
| 7,736,503 B2 | 6/2010 | Kennedy et al. | |
| 2003/0080043 A1 * | 5/2003 | Renganath | B01D 29/111 |
| | | | 210/347 |
| 2003/0173283 A1 * | 9/2003 | Pulek et al. | 210/315 |
| 2003/0213742 A1 * | 11/2003 | DeCoste | B01D 29/15 |
| | | | 210/486 |
| 2004/0020838 A1 | 2/2004 | Gabl | |
| 2006/0032806 A1 | 2/2006 | Parker | |
| 2006/0065607 A1 | 3/2006 | Bassett et al. | |
| 2008/0190839 A1 | 8/2008 | Girondi | |
| 2010/0012572 A1 * | 1/2010 | Verschaeve | B01D 29/012 |
| | | | 210/347 |

FOREIGN PATENT DOCUMENTS

| | | | | |
|---|---|---|---|---|
| GB | 2 185 695 | | 7/1987 | |
| GB | 2189404 A | * | 10/1987 | ............ B01D 25/26 |
| GB | 2202760 A | * | 10/1988 | ............ B01D 29/41 |
| GB | 2218918 | | 11/1989 | |
| GB | 2218918 A | * | 11/1989 | ............ B01D 29/41 |
| JP | 2004167364 A | * | 6/2004 | ............ B01D 29/39 |
| JP | 2006026453 | | 2/2006 | |
| WO | WO 98/23356 | | 6/1998 | |
| WO | WO 01/83077 | | 11/2001 | |
| WO | WO2007137843 A1 | * | 12/2007 | ........... B01D 29/012 |
| WO | WO 2010/053903 | | 5/2010 | |

OTHER PUBLICATIONS

International Search Report for PCT/US2009/063066, dated Jun. 18, 2010.

International Search Report for PCT/US2009/063080, dated Jun. 14, 2010.

* cited by examiner

FILTER ELEMENT AND SEAL THEREFOR

CROSS REFERENCE TO RELATED APPLICATIONS

This application is a national stage filing under 35 U.S.C. 371 of PCT/US2009/063066, filed Nov. 3, 2009, which claims priority to U.S. Application No. 61/111,185, filed Nov. 4, 2008, the disclosure of which is incorporated by reference in its/their entirety herein.

FIELD OF THE INVENTION

The present disclosure relates to fluid filter elements or cells and fluid filter assemblies. More particularly, this disclosure relates to seal arrangements for filter elements or cells.

BACKGROUND OF THE INVENTION

Lenticular filtration assemblies, comprising two disk-shaped filter mediums separated by a non-filtering separator element, are common in the art. Separator elements used in lenticular filters generally have a plurality of ribs extending radially outward from a central hub in a spoke-like fashion. An example of a lenticular cell-type filtration unit is found, for example, in U.S. Pat. No. 4,783,262 to Ostreicher et al., however, any rib geometry may be used in the separator element design to effectively maintain separation of the two disk-shaped filter mediums and provide a flow channel from the outer diameter or edge of the disk-shaped filtration unit to the stacked common bore.

Generally, the outer circumference of the two medium discs of a lenticular filtration unit are held together at an outer seal formed by an insert molding process which encapsulates the circumferences, typically with a polymeric material. U.S. Pat. No. 4,347,208 to Southall, the disclosure of which is herein incorporated by reference to the extent not inconsistent with the present disclosure, discloses a method of making a lenticular cell-type filtration unit having a sealed periphery which includes the steps of placing two medium discs, and an interposed separator element, into a mold and injecting a thermoplastic polymer into the mold to form a seal around the two medium discs.

Typically a plurality of lenticular cell-type filters is arranged as a column in a housing to form a filtration assembly. In a typical arrangement, upstream surfaces face each other and are sealed against bypass with a knife edge assembly in the form of a pre-molded ring with knife edges on each side. To maintain this knife edge seal after the media is wetted, existing assembly designs use an active follow system where pressure is continually placed on the filtration media. Active follow systems typically employ a spring or certain amount of pre-compression of the stack to maintain the seal. This disadvantage of this approach is that the pre-compression assembly takes additional space and knife edge seals are vulnerable to by-pass if there is any debris in the edge or any loss of the pre-compression. Since these cartridges are frequently run in stacks, there may be numerous locations where these knife edge seals may fail. Improved lenticular cell-type filters and methods or making them are always welcome. Additionally, assemblies no longer requiring an active follower would be greatly desired.

BRIEF SUMMARY OF THE DISCLOSURE

The present disclosure provides various filter cell elements for use in a housing to form a filtering assembly. The filter element has a media pack having an interior and a separator element having a passage therein for radial fluid communication between the media pack interior and an edge of the media pack. An overmold seal at the media pack edge seals the media pack, either directly or indirectly, to the separator element.

In a first embodiment, this disclosure provides a filter cell element that has a media pack having an interior and a first edge, and a separator element having a passage therein for radial fluid communication between the media pack interior and the media pack edge. The media pack has an overmold seal at the first edge sealing the media pack directly or indirectly to the separator element. The media pack may be formed by a first extension of filtration media and a second extension of filtration media, which may be disc-like. The media pack (e.g., the first extension of filtration media and the second extension of filtration media) may have a first layer of filtration media and a second layer of filtration media. The overmold seal may be a polymeric material, such as an elastomeric polymeric material. The filter cell element may have a molded seal at a second edge; this molded seal may be the same material or different than the overmold seal.

In a second embodiment, this disclosure provides a filter cell element that has a hub arrangement having a passage for fluid flow radially therethrough, and a first extension of filtration media having an edge proximate the hub arrangement and a second extension of filtration media having an inner edge proximate the hub arrangement. A separator element is present between the first extension of filtration media and the second extension of filtration media and has a passage for fluid flow to the hub arrangement. An overmold seal at the inner edge holds the first extension of filtration media and the second extension of filtration media directly or indirectly to the separator element. In some embodiments, each of the first extension of filtration media and the second extension of filtration media is a disc-like extension, and each may have a first layer of filtration media and a second layer of filtration media. The overmold seal may be a polymeric material, such as an elastomeric polymeric material. The filter cell element may have a molded seal at a second edge; this molded seal may be the same material or different than the overmold seal. The hub arrangement and the overmold seal may be integral or may be individual elements.

In yet another embodiment, this disclosure provides a method of forming a filter. The method includes providing filtration media pack having an interior, placing a preformed separator element within the interior of the media pack, and forming a polymeric seal over the media pack with the separator element therein. In some embodiments, this forming may be by injection molding. The polymeric seal can be thermoplastic material or thermosetting material. The filtration media pack may be two extensions of filtration media, and may be disc-like.

The lenticular cell-type filters can be arranged in a housing to form an assembly configuration, such as one that does not require the use of an active follower. The cell filter elements may have a central hub arrangement, via which multiple filter cells can be connected together. Fusing the hubs together with a leak-tight bonding technique permits the lenticular element to be stacked, but eliminates the need for an active follower system and its attendant problems. This central hub arrangement may also be formed by the overmolding process.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 1A:
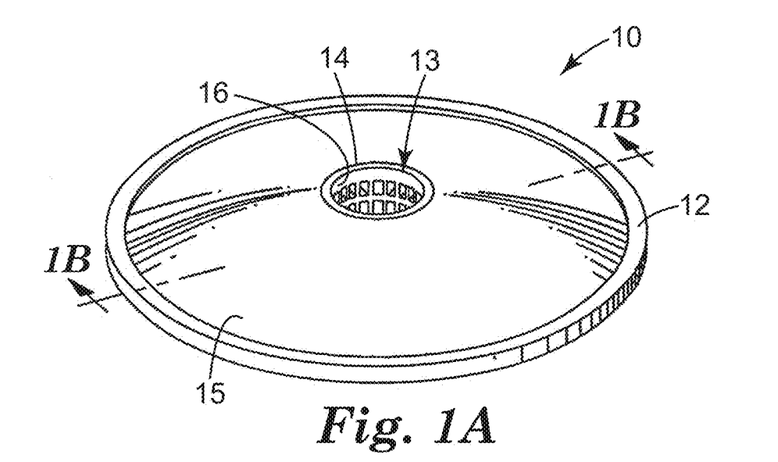
FIG. 1A is a perspective view of an illustrative filter cell.
Figure 1B:
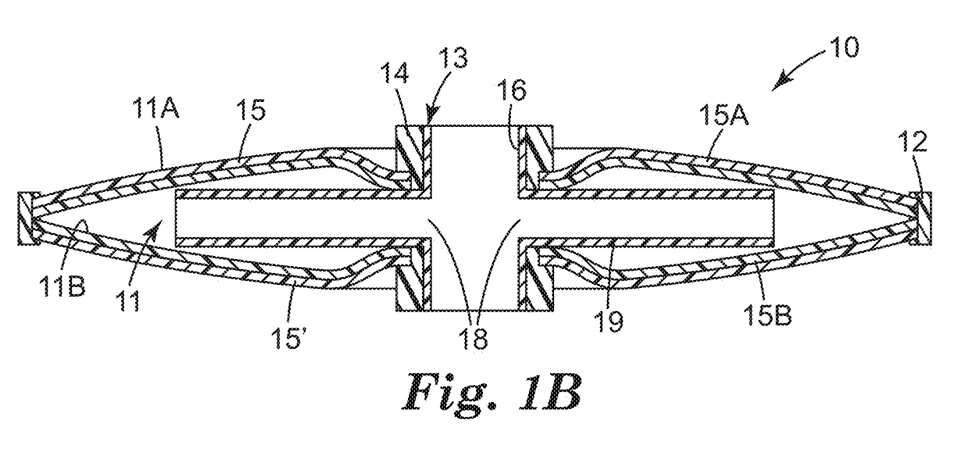
FIG. 1B is a cross-sectional view taken along line 1B-1B of FIG. 1A.

Referring to FIGS. 1A and 1B, an illustrative filter cell is illustrated as filter cell 10. Filter cells according to the present disclosure may be used, for example, in conjunction with filtration systems disclosed in related U.S. Pat. App. No. 61/111,156, filed Nov. 4, 2008, to Cashin et al., entitled "Fluid Interconnect,". Filter cell 10 has an outer seal 12 that defines an outer perimeter and circumference of filter cell 10 and an inner seal 14 proximate a central apertured core 16. Together, inner seal 14 and core 16 for a hub arrangement 13. Extending between outer seal 12 and inner seal 14 is filtration media 15. Inner seal 14 provides a fluid tight seal between core 16 and filtration media 15.

FIG. 1B shows an internal cross-sectional view of illustrative filter cell 10 of FIG. 1A. As readily seen in FIG. 1B, the filtration media extends from outer seal 12 to inner seal 14 at central core 16. The filtration media is composed of two disc-like sections, identified as media 15 and media 15', between which is an interior volume 11. Together, filtration media 15 and filtration media 15' are referred to as a media pack. In some embodiments, the media pack may be a pocket-like extension of filtration media, for example, folded upon itself, not needing an outer seal.

The outer surface of filtration media 15, 15' (designated as surface 11A in FIG. 1B) is the dirty-side or upstream side of media 15, 15' when fluid flow is from the exterior of filter cell 10 to interior 11; surface 11B in FIG. 1B is the filtered-side or downstream side of media 15, 15'. When fluid flow is in the opposite direction, surface 11B would be the dirty-side or upstream side of media 15, 15' and surface 11A would be the filtered-side or downstream side of media 15, 15'.

Examples of suitable filtration media 15, 15' may include cellulosic media, synthetic media, or a combination thereof. Media 15, 15' may be a non-woven material, and in some embodiments, may be charge modified, e.g., electrostatically treated. Media 15, 15' may have fine fibers or nanofibers present dispersed throughout media 15, 15' or present as a layer thereon. One exemplary material for media 15, 15' is cellulosic depth media, optionally containing filter aid such as diatomaceous earth or perlite. Examples of such media include Zeta Plus™ filtration media made by CUNO 3M. Another exemplary material for media 15, 15' is polytetrafluoroethylene (PTFE).

In the embodiment illustrated in FIG. 1B, filtration media 15, 15' is composed of a first, outer layer 15A and a second, inner layer 15B. Outer layer 15A and inner layer 15B may be selected, for example, to provide different filtering characteristics. U.S. Pat. Nos. 6,712,966 and 6,939,466 to Pulek et al., the disclosures of which are herein incorporated by reference to the extent not inconsistent with the present disclosure, disclose a fluid filtration unit having layers with different particle retention capabilities.

Central core 16 has a plurality of passages 18 therein which provide fluid communication, in a radially manner, between interior 11 and hub arrangement 13. A separator element 19, which, for example, is composed of a plurality of ribs, extends from hub arrangement 13 into interior 11 between filtration media 15 and filtration media 15'. Separator element 19 is a non-filtering element that facilitates fluid flow from interior 11 via radial passages 18 to hub arrangement 13. Additionally, separator element 19 inhibits collapse of filtration media 15, 15' into interior 11, for example, due to pressure of media 15, 15' from fluid being filtered by filter cell 10.

Media 15, 15' forms a tight seal with separator element 19 (e.g., a horizontal surface of separator element 19) proximate central core 16 to inhibit material from molded seal 14 from flowing (e.g., squirting) between media 15, 15' during the molding process of seal 14. During the molding process, for example, the injection molding machine usually holds media 15, 15' flush against separator element 19. Although separator element 19 may be perforated to facilitate lateral flow of the seal material, separator element 19 is impermeable at its center location proximate inner seal 14 to contain the seal material until it hardens (either by cooling or curing).

As indicated above, filtration media 15, 15' is sealed at its outer perimeter by outer seal 12, which is typically a polymeric, molded seal, made for example, by injection molding. Examples of suitable thermoplastic materials for outer seal 12 include polypropylene, polyethylene, nylon, and polysulfone. Thermoset materials, such as melamine or phenol formaldehyde may alternately be used for outer seal 12. Any of these materials may optionally include a filler therein. Thermoplastic polymers are preferred because they permit melt bonding techniques to join elements together. One exemplary material for outer seal 12 is Santoprene™ polymeric material, a polypropylene-based elastomeric material from Exxon Mobil Chemical. Other exemplary materials for outer seal 12 are polypropylene and talc-filled polypropylene.

Filtration media 15, 15' is also sealed at its inner edge to hub arrangement 13, specifically, by inner seal 14 that is proximate core 16. Filtration media 15, 15' is held by inner seal 14 in a leak-free manner, so that all fluid moving from surface 11A to surface 11B, or vice versa, must pass through filtration media 15, 15'. Inner seal 14 may be formed of two seal portions, one present on each side of filter cell 10 (i.e., one for filtration media 15 and one for filtration media 15') or one inner seal 14 may connected to both filtration media 15 and filtration media 15'. In some embodiments, inner seal 14 and core 16 are integral, in that one piece or element is formed around filtration media 15, 15' for both inner seal 14 and core 16 to provide hub arrangement 13. In other embodiments, core 16 is a piece or element separate from inner seal 14, but that is attached thereto to provide hub arrangement 13. Inner seal 14, according to this disclosure, is an overmold seal. In some embodiments, core 16 is a preform part.

By the term "preform part" and variants thereof, as used in this context herein, it is meant that core 16 is formed prior to formation of inner seal 14 to form hub arrangement 13. In one typical manufacturing process for filter cell 10, as described further below, filtration media 15, 15' would be preformed, separator element 19 would be preformed, core 16 would be preformed, and the three parts (media 15, 15', separator element 19 and core 16) would be placed together in a mold, for molding of inner seal 14 and formation of hub arrangement 13. In another typical manufacturing process for filter 10, as described further below, filtration media 15, 15' would be preformed, separator element 19 would be preformed, and the two parts (media 15, 15' and separator element 19) would be placed together in a mold, for formation of hub arrangement 13 that has integral inner seal 14 and core 16.

Herein, the molded inner seal 14 is sometimes referred to as an "overmold," or variant thereof. Among other things, as will be understood from the following descriptions, the term "overmold" in this context indicates that inner seal 14 is molded in place on filtration media 15 and optionally on separator element 19, and is not itself preformed. In some embodiments, inner seal 14 is molded in place on filtration media 15, 15', separator element 19 and core 16.

Overmolded inner seal 14 is formed from a polymeric material (e.g., a thermoplastic material or a thermosetting material), which upon cooling or curing, as appropriate, forms a fluid-tight seal against filtration media 15, 15'. Examples of suitable thermoplastic materials for overmolded inner seal 14 include polypropylene, polyethylene, nylon, and polysulfone. Thermoset materials, such as melamine or phenol formaldehyde may alternately be used for overmolded inner seal 14. Any of these materials may optionally include a filler therein. Thermoplastic polymers are preferred because they permit melt bonding techniques to join elements together. One exemplary material for inner seal 14 is Santoprene™ polymeric material, a polypropylene-based elastomeric material from Exxon Mobil Chemical. Another exemplary material for inner seal 14 is polypropylene.

Figure 2:
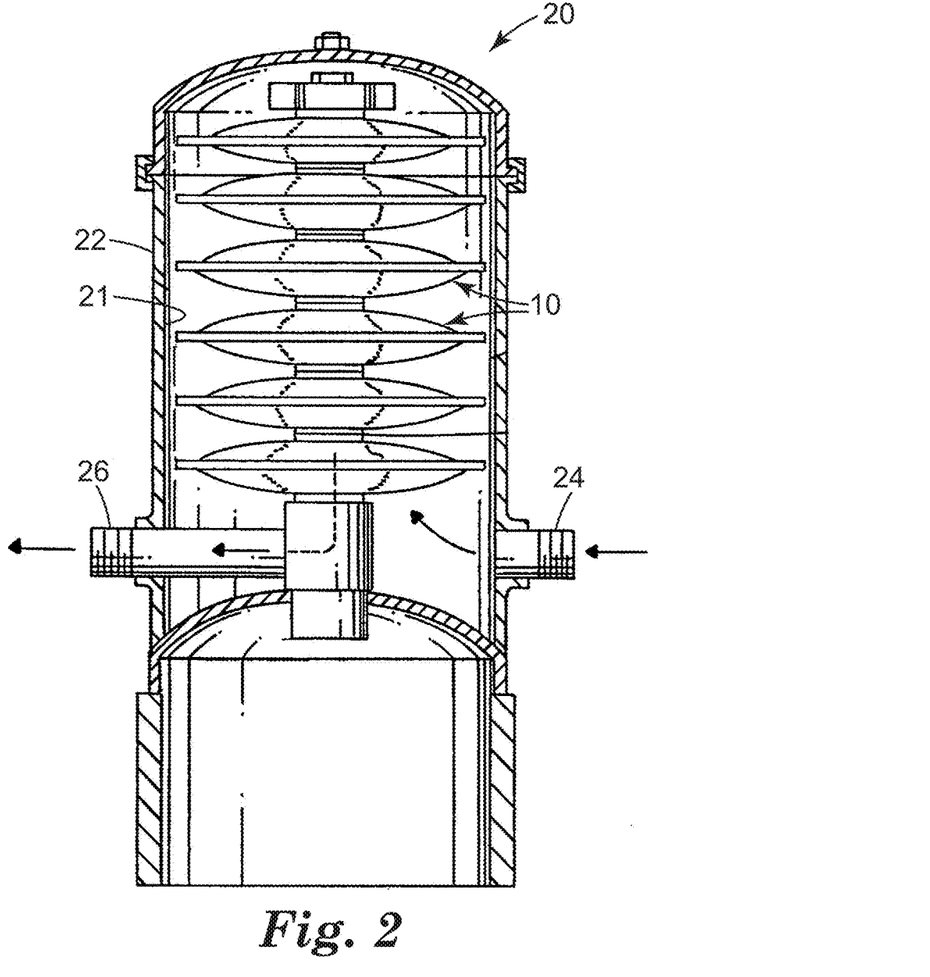
FIG. 2 is a cross-sectional side view of a filter assembly having a housing with a plurality of filter cells therein.

FIG. 2 illustrates an illustrative filtration assembly 20 having a housing 22 with a plurality of filter cells 10 retained within interior 21 of housing 22. Assembly 20 has a fluid inlet 24 and a fluid outlet 26. In use, fluid (i.e., liquid or gas) enters assembly 20 via inlet 24, passes through filter media 15 between outer seal 12 and inner seal 14 to the interior of filter cell 10. The filtered fluid passes into hub arrangement 13 and exits assembly 20 via outlet 26. It should be understood that filter assembly 20 is merely an illustrative filter assembly, and that filter cells according to this invention could be used in filter assembly 20 or in other assembly designs.

Figure 3:
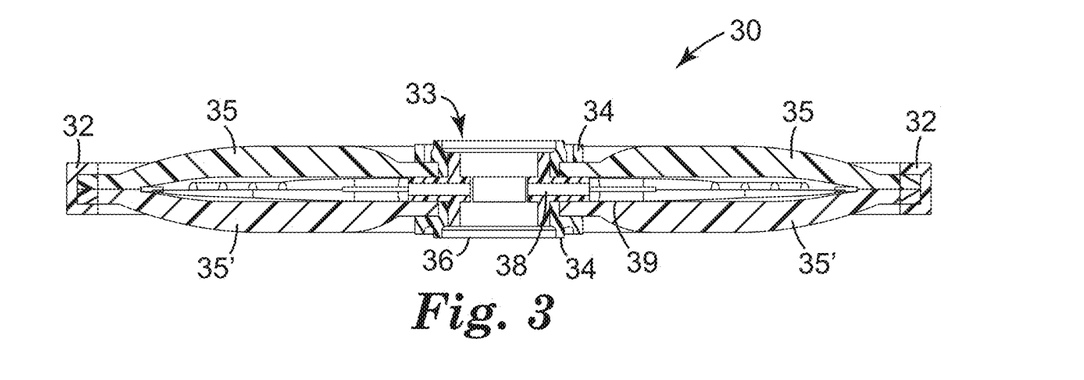
FIG. 3 is a cross-sectional view of a first embodiment of a filter cell according to this disclosure.

A first specific element of a filter cell having an overmold inner seal is illustrated in FIG. 3 as filter cell 30, which has its overmold inner seal connected to a preformed core. Unless indicated otherwise, the various elements of filter cell 30 are the same or similar to the elements of filter cell 10. Filter cell 30 has a hub arrangement 33 that includes inner seal portion 34 and core portion 36. A media pack comprising filtration media 35, 35' is held by inner seal portion 34 in a leak-free manner to core portion 36. Extending through hub arrangement 33 is a separator element 39, which extends between filtration media 35, 35'. Separator element 39 includes a plurality of radially positioned passages 38 that provide fluid communication between the interior of filtration media 35, 35' and hub arrangement 33. Inner seal portion 34 is overmolded over filtration media 35, 35'. In filter cell 30, inner seal portion 34 seals filtration media 35, 35' together and to core portion 36 and to separator element 39.

In use, fluid passes through filtration media 35, 35' to passages 38 extending proximate separator element 39. Passages 38 allow radial flow of the fluid through the overmolded inner seal portion 34 and core portion 36. When used in assembly 20 of FIG. 2, fluid would pass from housing interior 21 through filtration media 35, 35' to separator element 39 and to passages 38 and exit via hub arrangement 33.

To form filter cell 30, filtration media 35, 35' is cut to size or otherwise shaped and sized as desired; in most embodiments, filtration media is annular. Core portion 36 is preformed, for example, by injection molding plastic or metal. Separator element 39 is also preformed, for example by injection molding plastic or metal. Filtration media 35, 35' with core portion 36 and separator element 39 therebetween is placed in a mold and clamped to keep its edges together. An outer seal (see outer seal 12 of FIGS. 1A and 1B) may be formed, for example, by injection molding. Filtration media 35, 35', core portion 36 and separator element 39 are clamped together in a mold. With pressure maintained on media 35, 35', core portion 36 and separator element 39, polymeric material is applied (e.g., injection molded) in the mold to form inner seal 34 upon cooling and hardening, or curing, as appropriate, of the polymeric material.

The resulting filter cell has inner seal portion 34 sealing media 35, 35' to core portion 36. Access is available to the center of hub arrangement 33 from filtration media 35, 35' via passages 38.

Figure 4:
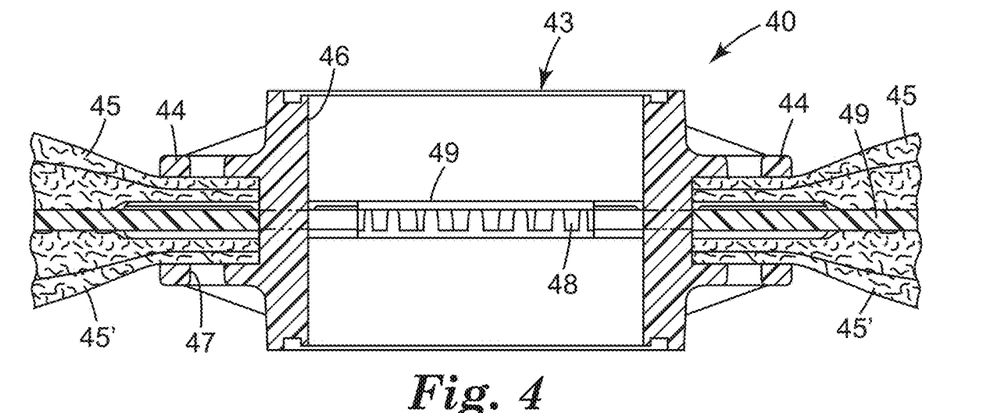
FIG. 4 is a cross-sectional view of a second embodiment of a filter cell according to this disclosure.

A second specific embodiment of a filter cell having an overmold inner seal is illustrated in FIG. 4 as filter cell 40, which has its overmolded inner seal integral with its core. Unless indicated otherwise, the various elements of filter cell 40 are the same or similar to the elements of filter cell 10. Filter cell 40 has a hub arrangement 43 that includes inner seal portion 44 and core portion 46. A media pack comprising filtration media 45, 45' is held by inner seal portion 44 in a leak-free manner to core portion 46. Extending through hub arrangement 43 is a separator element 49, which extends between filtration media 45, 45'. Separator element 49 includes a plurality of passages 48 that provide fluid communication between the interior of filtration media 45, 45' and hub arrangement 43. Separator element 49 may include ribs, gussets, or other support to provide structural rigidity to element 49. Hub arrangement 43, which includes inner seal portion 44 and core portion 46, is overmolded over filtration media 45, 45'. In filter cell 40, inner seal portion 44 seals filtration media 45, 45' together and to separator element 49.

Figure 4A:
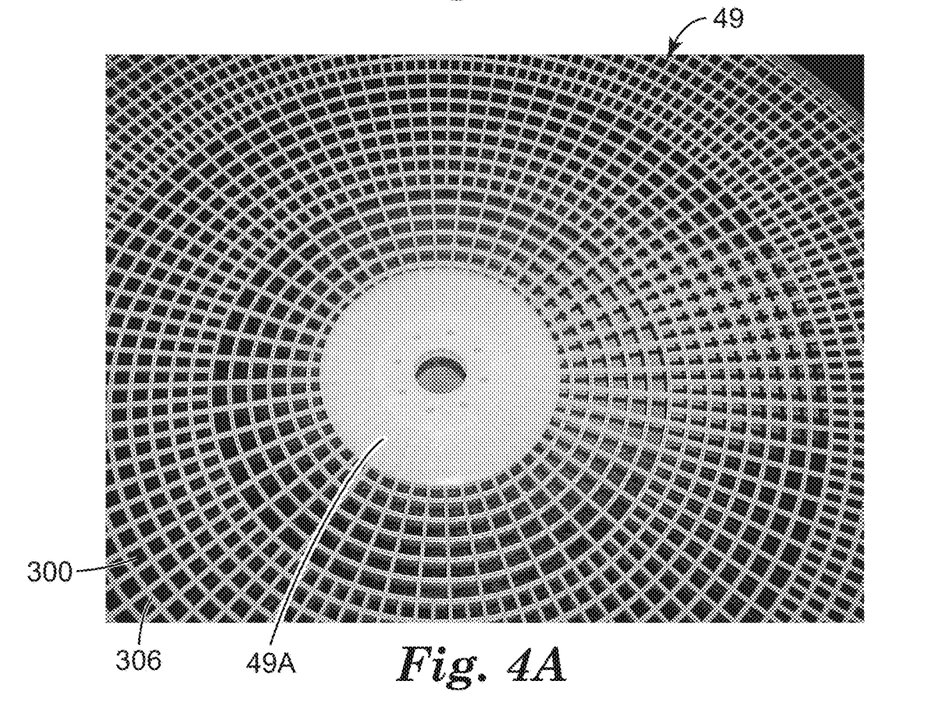
FIG. 4A is a plan view of the separator element of FIG. 4.
Figure 4B:
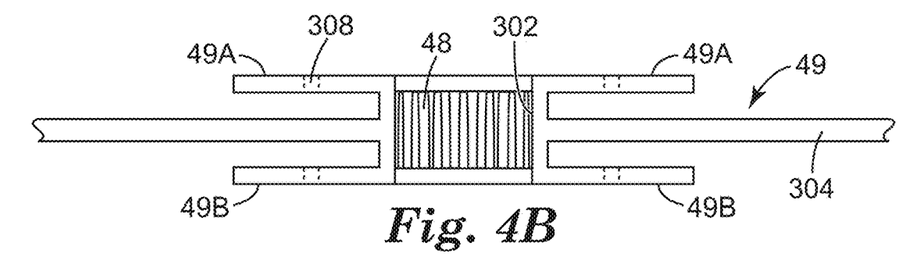
FIG. 4B is a schematic cross-sectional side view of the separator element of FIG. 4A.

Separator element 49 is illustrated in FIGS. 4A and 4B. This embodiment of separator element 49 has channels 300 that flow radially inward/outward and also includes a first washer 49A present on a first side of separator element 49, and a second washer 49B present on a second side of separator element 49 opposite first washer 49A, and a central core 302. A plurality of radially extending ribs 304 extend from the central core 302 between the first and the second washers, and a plurality of circular concentric ribs 306 intersecting with the plurality of radially extending ribs. Washers 49A, 49B, present at the inner periphery of separator element 49, support filtration media 45, 45' during the overmolding process and facilitate the mechanical bonding of inner seal 14 material with separator 49. Washers 49A, 49B may include apertures 308 therethrough that allow the polymeric bonding material to pass therethrough for additional mechanical bonding. These apertures also hold the overmolded material together so it can resist the expansive forces of the compressed media. As an example, a separator element 49 having a 15 inch (about 38 cm) diameter may have 3 inch (about 7.6 cm) diameter washers 49A, 49B. Either or both washers 49A, 49B may be formed (e.g., injection molded) unitary with separator 49 or may be subsequently attached thereto, for example, by ultrasonic or solvent welding.

In use, fluid passes through filtration media 45, 45' to passages 48 in separator element 49. Passages 48 allow radial flow of the fluid through the overmolded inner seal portion 44 and core portion 46. When used in assembly 20 of FIG. 2, fluid would pass from housing interior 21 through filtration media 45, 45' to separator element 49 and passages 48 and exit via hub arrangement 43.

To form filter cell 40, filtration media 45, 45' is cut to size or otherwise shaped and sized as desired; in most embodiments, filtration media 45, 45' is annular. Separator element 49 is preformed, for example by injection molding plastic or metal. Filtration media 45, 45' with separator element 49 therebetween is placed in a mold and clamped to keep its edges together. An outer seal (see outer seal 12 of FIGS. 1 and 3) may be formed, for example, by injection molding. Filtration media 45 and separator element 49 are clamped together in a mold, in preparation of forming hub arrangement 43. With pressure maintained on media 45 and separator element 49, polymeric material is applied (e.g., injection molded) in the mold to form hub arrangement 43 upon cooling and hardening, or curing, as appropriate, of the polymeric material.

The resulting filter cell has inner seal portion 44 and core portion 46 integral with each other forming hub arrangement 43. Access is available to the center of hub arrangement 43 via passages 48 in separator element 49. Where media 45, 45' and separator element 49 are clamped during the molding process, the result is pockets 47 in seal portion 44. Both a top view and bottom view of filter cell 40 would have a plurality of pockets 47 distributed (usually evenly distributed) in inner seal portion 44 around core portion 46. In some embodiments, the highly compressed filtration media 45, 45' expands to at least partially fill pockets 47.

Figure 5:
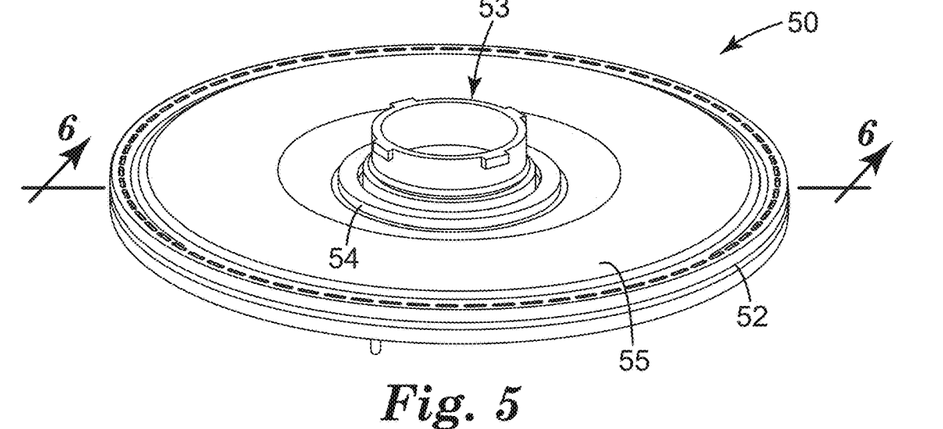
FIG. 5 is a perspective view of a third embodiment of a filter cell according to this disclosure.
Figure 6:
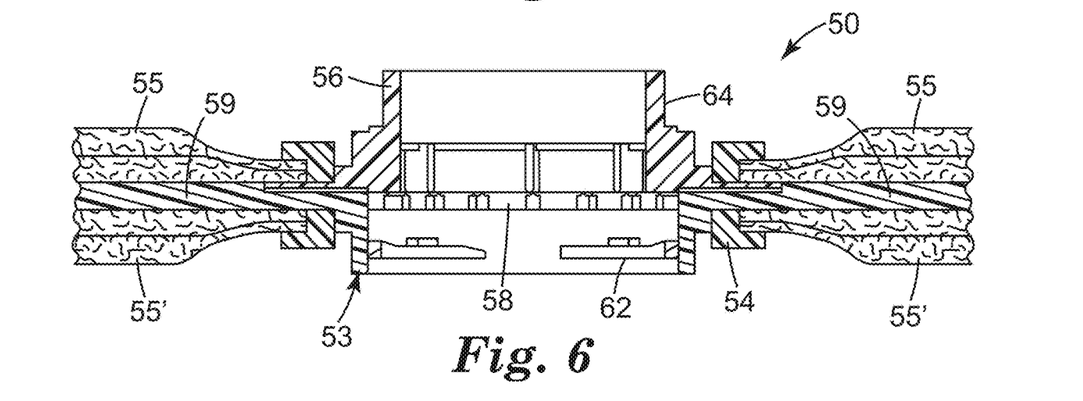
FIG. 6 is a cross-sectional view of the filter cell of FIG. 5.

A third specific embodiment of a filter cell having an overmold inner seal is illustrated in FIGS. 5 and 6 as filter cell 50, which has its overmolded inner seal separate from its preformed core. Unless indicated otherwise, the various elements of filter cell 50 are the same or similar to the elements of filter cell 10 and filter cell 40. Filter cell 50 has an outer seal 52, an inner seal 54 and an extension of filtration media 55, 55' between outer seal 52 and inner seal 54. Filtration media 55, 55' is held by inner seal portion 54 in a leak-free manner to a hub arrangement 53 that includes inner seal 54 and a core portion 56. Core portion 56 may have at least one rib, gusset or other support for structural rigidity. Hub arrangement 53 also includes a separator element 59 that extends through inner seal 54 to between filtration media 55, 55'. Separator element 59 includes a plurality of passages 58 that provide fluid communication between the interior of filtration media 55, 55' and through hub arrangement 53. Inner seal 54 is overmolded over filtration media 55, 55', core portion 56 and separator element 59.

In use, fluid passes through filtration media 55, 55' to passages 58 in separator element 59. Passages 58 allow radial flow of the fluid through the overmolded inner seal portion 54 and core portion 56. When used in assembly 20 of FIG. 2, fluid would pass from housing interior 21 through filtration media 55, 55' to separator element 59 and passages 58 and exit via hub arrangement 53.

To form filter cell 50, filtration media 55, 55' is cut to size or otherwise shaped and sized as desired; in most embodiments, filtration media is annular. Core portion 56 is preformed, for example, by injection molding plastic or metal fabrication. Separator element 59 is also preformed, for example by injection molding plastic or metal fabrication. Filtration media 55, 55' with core portion 56 and separator element 59 therebetween is placed in a mold and clamped to keep its edges together. An outer seal (see outer seal 12 of FIGS. 1 and 3) may be formed, for example, by injection molding. Filtration media 55, 55', core portion 56 and separator element 59 are clamped together in a mold. With pressure maintained on media 55, 55', core portion 56 and separator element 59, polymeric material is applied (e.g., injection molded) in the mold to form inner seal 54 upon cooling and hardening, or curing, as appropriate, of the polymeric material.

The resulting filter cell has inner seal 54 holding together filtration media 55, 55', core portion 56 and separator element 59. Access is available to the center of hub arrangement 53 via passages 58 in separator element 59.

Figure 7:
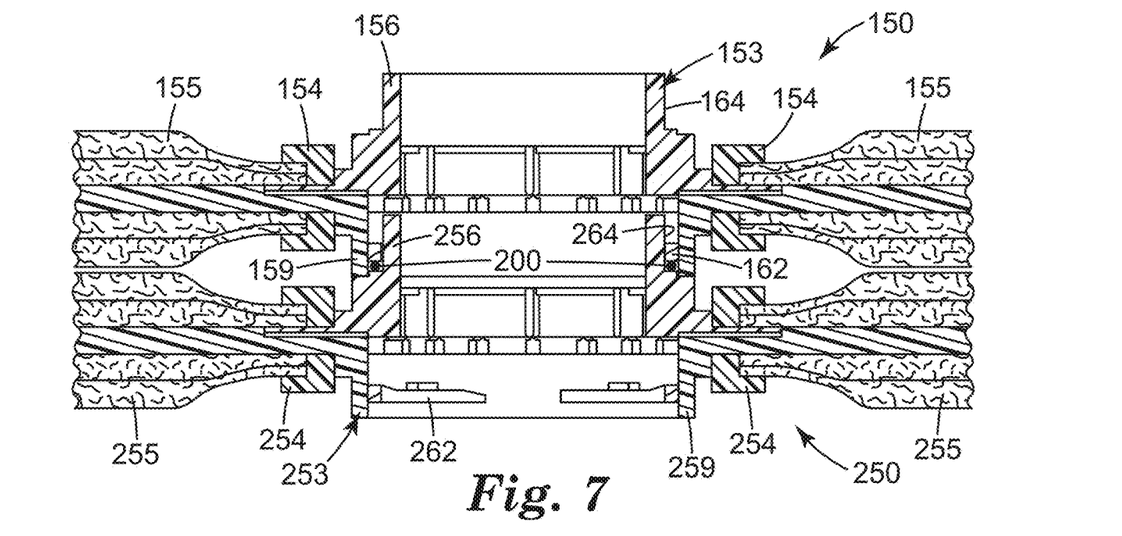
FIG. 7 is a cross-sectional view of two engaged filter cells of FIG. 5.

In the embodiment of FIGS. 5 and 6, filter cell 50 includes a connection system integral with hub arrangement 53. Separator element 59 includes a first part 62 of a twist-lock or bayonet mechanism and core portion 56 includes an engaging second part 64 of the twist-lock or bayonet mechanism. FIG. 7 illustrates two filter cells connected together.

FIG. 7 has a first filter cell 150 having a central hub arrangement 153 centered on filtration media 155. Hub arrangement 153 includes a core portion 156 and a separator element 159, both held to filtration media 155 by an overmolded seal 154. Separator element 159 includes a first part 162 of a twist-lock or bayonet mechanism and core portion 156 includes an engaging second part 164 of the twist-lock or bayonet mechanism. Attached to first filter cell 150 via the twist-lock or bayonet mechanism is a second filter cell 250. Second filter cell 250 has a central hub arrangement 253 centered on filtration media 255. Hub arrangement 253 includes a core portion 256 and a separator element 259, both held to filtration media 255 by an overmolded seal 254. Separator element 259 includes a first part 262 of a twist-lock or bayonet mechanism and core portion 256 includes an engaging second part 264 of the twist-lock or bayonet mechanism. Filter cells 150, 250 are engaged by first part 262 of second cell 250 engaging with second part 164 of first cell 150. In this embodiment, present between first filter cell 150 and second filter cell 250, particularly between first part 162 and second part 264, is a sealing member 200, such as a gasket or preferably an O-ring.

Multiple filter cell elements (e.g., filter cell 10, filter cell 40, filter cell 50) may be connected together by any suitable means. Examples of connection modes include thermal bonding, spin welding, ultrasonic welding, solvent bonding, and adhesive. Various mechanical modes in addition to the twist-lock or bayonet mechanism described above, may alternately or additionally used. Mechanical attachment mechanisms may be molded into the filter cell or added subsequently.

In each of the filter cells according to this disclosure (e.g., filter cell 10, filter cell 40, filter cell 50) the separator element (e.g., separator element 19, separator element 49, separator element 59, respectively) is a preformed element and may be, for example, polymeric (plastic) material or metal. In some embodiments, the core portion of the hub arrangement (e.g., core portion 56) is a preformed element and may be, for example, polymeric (plastic) material or metal. In some embodiments, it is preferred to have the separator element, the hub arrangement and any other preformed parts be non-metallic. This would allow the filter cell to be readily disposable (e.g., incinerable).

Thus, embodiments of the FILTER ELEMENT AND SEAL THEREFOR are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A filter element comprising:
    a preformed separator element with a central core having a plurality of passages, a first washer on a first side of the preformed separator element, a second washer on a second side of the preformed separator element, and a plurality of radially extending ribs from the central core, and the plurality of radially extending ribs extending from the central core between the first and the second washers;
    a first filter layer in contact with the first washer and a second filter layer in contact with the second washer, the plurality of radially extending ribs disposed in an interior between the first and second filter layers;
    the first filter layer and the second filter layer extending between an outer seal and a hub arrangement;
    the hub arrangement comprising an inner seal portion covering both the first filter layer and the second filter layer, and a core portion; the inner seal portion and the core portion integral with each other forming the hub arrangement and the hub arrangement formed from a polymeric injection mold material overmolded over the first and second filter layers such that inner seal portion seals the first and second filter layers together and to the preformed separator element.

2. The filter element of claim 1 wherein the first washer and the second washer both comprise apertures.

3. The filter element of claim 2 wherein the inner seal portion comprises a plurality of pockets.

4. The filter element of claim 3 wherein the plurality of pockets are distributed in the inner seal portion around the core portion.

5. The filter element of claim 1 wherein the inner seal portion comprises a plurality of pockets.

6. The filter element of claim 5 wherein the plurality of pockets are distributed in the inner seal portion around the core portion.

7. The filter element of claim 1 where the outer seal is a polymeric molded seal.

8. The filter element of claim 1 wherein the preformed separator element has channels that flow radially inward/outward.

9. A method of making the filter element of claim 1 comprising:
    providing the preformed separator element;
    cutting the first filter layer in an annular shape and cutting the second filter layer into an annular shape;
    placing the first filter layer in contact with the first washer and placing the second filter layer in contact with the second washer;
    placing the first filter layer, the preformed separator element, and the second filter layer into a mold and forming the outer seal by injection molding;
    clamping the first filter layer to the first washer and clamping the second filter layer to the second washer in a mold; and
    applying polymeric material to form the hub arrangement having the inner seal portion and the core portion integral with each other.

10. The method of claim 9 wherein clamping the first filter layer to the first washer and clamping the second filter layer to the second washer in the mold forms the plurality of pockets in the inner seal portion.

11. The method of claim 9 wherein the first filter layer or the second filter layer expand to at least partially fill the plurality of pockets.

* * * * *